United States Patent
Jernigan, IV et al.

(10) Patent No.: US 9,779,153 B2
(45) Date of Patent: Oct. 3, 2017

(54) DATA TRANSFER BETWEEN STORAGE SYSTEMS USING DATA FINGERPRINTS

(71) Applicant: NetApp, Inc., Sunnyvale, CA (US)

(72) Inventors: Richard P. Jernigan, IV, Sewickley, PA (US); Jonathan A. Curley, Pittsburgh, PA (US); Subramaniam Periyagaram, Campbell, CA (US)

(73) Assignee: NETAPP, INC., Sunnyvale, CA (US)

( * ) Notice: Subject to any disclaimer, the term of this patent is extended or adjusted under 35 U.S.C. 154(b) by 312 days.

(21) Appl. No.: 14/195,509

(22) Filed: Mar. 3, 2014

(65) Prior Publication Data

US 2015/0248466 A1  Sep. 3, 2015

(51) Int. Cl.
| | |
|---|---|
| *G06F 17/30* | (2006.01) |
| *G06F 11/07* | (2006.01) |
| *G06F 11/20* | (2006.01) |
| *G06F 11/14* | (2006.01) |
| *G06F 3/06* | (2006.01) |

(52) U.S. Cl.
CPC .... *G06F 17/30575* (2013.01); *G06F 11/0727* (2013.01); *G06F 11/0793* (2013.01); *G06F 11/1448* (2013.01); *G06F 11/1453* (2013.01); *G06F 11/2094* (2013.01); *G06F 17/3033* (2013.01); *G06F 3/067* (2013.01); *G06F 3/0647* (2013.01); *G06F 2201/83* (2013.01)

(58) Field of Classification Search
CPC ..... G06F 3/067; G06F 3/0647; G06F 2201/83
USPC ....................................................... 707/632
See application file for complete search history.

(56) References Cited

U.S. PATENT DOCUMENTS

| | | | |
|---|---|---|---|
| 5,754,844 A | 5/1998 | Fuller | |
| 8,065,277 B1 * | 11/2011 | Gardner | G06F 17/30067 707/673 |
| 8,326,798 B1 * | 12/2012 | Driscoll | G06F 17/30082 707/610 |
| 8,538,926 B2 * | 9/2013 | Barton | G06F 17/30575 707/652 |
| 8,620,886 B1 * | 12/2013 | Madan | G06F 17/00 707/697 |
| 8,655,848 B1 | 2/2014 | Leverett et al. | |
| 8,930,311 B1 * | 1/2015 | Wang | G06F 17/30283 707/628 |

(Continued)

OTHER PUBLICATIONS

International Search Report and Written Opinion received for PCT Patent Application No. PCT/US2015/018521, mailed Jun. 8, 2015, 12 pages.

*Primary Examiner* — Kris Mackes
*Assistant Examiner* — Tiffany Bui
(74) *Attorney, Agent, or Firm* — Cooper Legal Group, LLC

(57) ABSTRACT

A system and method for data replication is described. A destination storage system receives a message from a source storage system as part of a replication process. The message includes an identity of a first file, information about where the first file is stored in the source storage system, a name of a first data being used by the first file and stored at a first location of the source storage system, and a fingerprint of the first data. The destination storage system determines that a mapping database is unavailable or inaccurate, and accesses a fingerprint database using the fingerprint of the first data received with the message to determine whether data stored in the destination storage system has a fingerprint identical to the fingerprint of the first data.

19 Claims, 4 Drawing Sheets

(56) References Cited

U.S. PATENT DOCUMENTS

| | | | |
|---|---|---|---|
| 8,943,024 B1 * | 1/2015 | Gardner | G06F 17/30156 707/640 |
| 9,002,799 B2 * | 4/2015 | Ngo | G06F 3/061 707/655 |
| 2008/0005141 A1 | 1/2008 | Zheng et al. | |
| 2009/0106758 A1 | 4/2009 | Giampaolo | |
| 2010/0198783 A1 * | 8/2010 | Wang | G06F 17/30581 707/610 |
| 2010/0293142 A1 * | 11/2010 | Ackerman | H04L 67/06 707/640 |
| 2014/0067764 A1 * | 3/2014 | Prahlad | G06F 17/30156 707/661 |
| 2015/0006490 A1 * | 1/2015 | Balasubramanian | G06F 17/30371 707/690 |

* cited by examiner

DATA TRANSFER BETWEEN STORAGE SYSTEMS USING DATA FINGERPRINTS

BACKGROUND

A source storage system can perform a data replication process to cause data to be transferred from the source storage system to a destination storage system. The destination storage system can maintain a database that maps the data between the source storage system and the destination storage system for subsequent data replication processes. In some instances, however, the database can become unavailable or inaccurate when an operation takes place on either the source storage system or the data storage system that alters the mapping of the data between the storage systems. In such case, subsequent data replication processes can become inefficient as the previously transferred data is not detected as being already received by the destination storage system.

DETAILED DESCRIPTION

Figure 1:
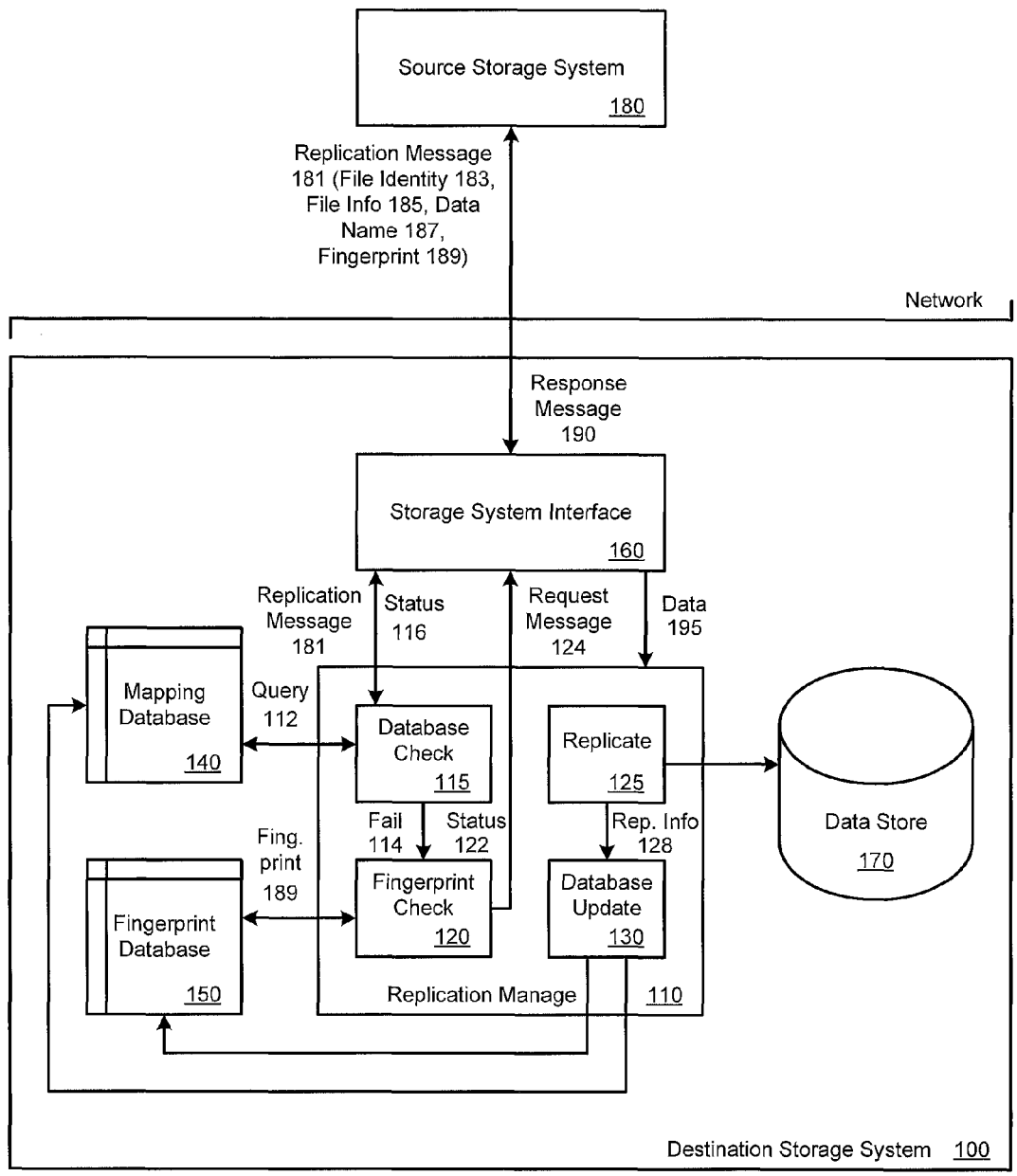
FIG. 1 illustrates an example system to perform data replication using data fingerprints.

Examples described herein provide for a replication system that can use data fingerprints to preserve data replication efficiency in situations where a mapping database between two storage systems is unavailable or inaccurate. A mapping database can operate as a translation table that maps data stored at source-side data storage locations to replicated data stored at destination-side data storage locations. Subsequent replication processes can use the mapping database to prevent duplication of data. When the mapping database is unavailable or inaccurate, the destination storage system can use data fingerprints to identify similar blocks of data and then verify whether the blocks of data are identical without transferring the data between systems.

In one example, a system, such as a destination storage system, can receive a replication message as part of a data replication process from a source storage system. As used herein, a "source storage system" can refer to a storage system that is a source of a data replication process, and a "destination storage system" can refer to a storage system that is a destination or target of the data replication process in which data from the source storage system is to be transferred or copied to. The message can include (i) an identity of a first file, (ii) information about where the first file is stored in the source storage system, (iii) a name of a first data being used by the first file and stored at a first location of the source storage system, and (iv) a fingerprint of the first data. In response to receiving the replication message from the source storage system, the destination storage system can determine whether its mapping database is unavailable or inaccurate (or corrupt).

The mapping database can be determined to be unavailable or inaccurate if an operation occurred that altered the mapping of the data between the source and destination storage system (e.g., as a result of local names being changed on the source storage system and/or the destination storage system). For example, the mapping database can be no longer useful if either the source-side or destination-side file system is moved from a previous location to a new location. In response to determining that the mapping database is unavailable or inaccurate, the destination storage system can access a fingerprint database using the fingerprint of the first data received with the replication message to determine whether data stored in the destination storage system has a fingerprint identical to the fingerprint of the first data. The destination storage system can maintain the fingerprint database that stores a plurality of entries of fingerprints. Each entry can correspond to data stored in the destination storage system and can include (i) a respective fingerprint for that data, (ii) an identity of a file that uses that data, and (iii) respective information about where that file is stored in the source storage system.

According to some examples, if a second data stored in the destination storage system has a fingerprint identical to the fingerprint of the first data, the destination storage system can determine that the first data and the second data are at least similar, and can transmit to the source storage system, a request message to confirm whether the first data is identical to the second data that is already stored in the destination storage system. The request message can include (i) an identity of a second file that uses the second data and (ii) respective information about where the second file is stored in the source storage system. In this manner, the destination storage system can ask the source storage system to check whether the first data is identical to the second data without having to transfer the second data to the source storage system.

If the destination storage system receives from the source storage system a response message that indicates that the first data is identical to the second data stored in the destination storage system, the destination storage system can generate or update its mapping database accordingly. For example, the destination storage system can generate or update its mapping database by associating the name of the first data stored at the first location of the source storage system and the local location where the second data is stored in the destination storage system.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices such as servers, desktop computers, cellular or smartphones, personal digital assistants (e.g., PDAs), laptop computers, printers, digital picture frames, network equipments (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system to perform data replication using data fingerprints. A destination storage system can use data fingerprints in order to determine whether data that is to be replicated from a source storage system is already stored in the destination storage system. This enables the destination storage system to preserve storage efficiency (e.g., by not storing redundant data) during a replication process even when its mapping database (that maps data stored at source-side data storage locations to data stored at destination-side data storage locations) is inaccurate or corrupt.

According to an example, system 100, such as a destination storage system, can include a replication manage 110, a storage system interface 160, a fingerprint database 150, a mapping database 140, and a data store 170. Depending on implementation, one or more components of system 100 can be implemented on a computing device, such as a server, laptop, PC, etc., or on multiple computing devices that can communicate with a fleet or set of devices over one or more networks. System 100 can also be implemented through other computer systems in alternative architectures (e.g., peer-to-peer networks, etc.). Logic can be implemented with various applications (e.g., software) and/or with firmware or hardware of a computer system that implements system 100.

System 100 can also communicate, over one or more networks via a network interface (e.g., wirelessly or using a wireline), with one or more other storage systems, such as a source storage system 180, using a storage system interface 160. The storage system interface 160 can enable and manage communications between system 100 and the source storage system 180. Data that is to be replicated can also be transmitted between the systems 100, 180 using the storage system interface 160.

In one example, a source storage system 180 can store a plurality of different data using a source-side file system, and system 100 can be used to backup the data of the source storage system 180. In such a case, system 100 can use a mapping database, such as the mapping database 140, to map the source-side storage locations (where data is stored in the source storage system 180) to its destination-side storage locations (where a copy of that data is stored). In this manner, a mirror of the file system of the source storage system 180 can be maintained at system 100 for a long period of time, while being incrementally updated (e.g., perform a data replication process in response to a user input, or periodically every day, every few days, every week, etc.).

According to some examples, the source storage system 180 and/or system 100 can execute a storage operating system that implements a file layout that supports high volume data storage and that provides a mechanism to enable file systems to access disk blocks. An example of a file layout can be the Write Anywhere File Layout (WAFL) from NetApp Inc., of Sunnyvale, Calif., which enables detecting and sharing of regions of data between two storage systems at a 4 KB block granularity using virtual volume block numbers (VVBN). Another example of a file layout can be NetApp Inc.'s MetaWAFL, which enables detecting and sharing of regions of data between two storage systems that is not exactly 4 KB block in length or alignment by using variable-length extents (where an extent can be a contiguous area of storage). In the example of FIG. 1, the source storage system 180 and/or system 100 can execute a storage operating system that implements MetaWAFL.

When replicating a file system between the source storage system 180 and system 100, a logical replication model can be used, for example, so that data that is to be transferred from the source storage system 180 to system 100 can be described using a message. As part of a data replication process between the source storage system 180 and system 100, the source storage system 180 can transmit a replication message 181 to system 100. According to an example, the replication message 181 can include an identity 183 of a first file that is to be replicated (e.g., the file's inode number and/or generation number), file information 185 about where the first file is stored in the source storage system, a name 187 of a first data that is used by the first file and stored at a first location of the source storage system, and a fingerprint 189 of the first data. The replication message 181 can indicate to system 100, for example, that "File X, which starts at offset Y and has length Z, uses data named Foo1 that has a fingerprint ABCD," where File X is the file name 183, offset Y and length Z is the file information 185, Foo1 is the virtual volume block number or an extent where that data is stored at the source (e.g., the data name 187), and ABCD is the fingerprint 189 of the data.

The replication manage 110 can receive the replication message 181 via the storage system interface 160. In one example, the replication manage 110 can include a database check 115, which can access the mapping database 140 of system 100 and determine whether the mapping database 140 is unavailable (e.g., does not exist or has been moved or deleted) or inaccurate (e.g., is corrupt or has an incorrect mapping entry). In some examples, multiple mapping databases 140 can be used by system 100 for backing up multiple storage systems. The database check 115 can send a query 112, for example, to the mapping database 140 to determine the availability and/or accuracy of the mapping database 140 corresponding to the source storage system 180. System 100 can use the mapping database 140 as a translation table that maps data stored at the source storage system 180 to replicated data stored at system 100.

For example, if the mapping database 140 is available and accurate, the database check 115 can use the information from the replication message 181 (e.g., for File X, which uses data named Foo1) and access the mapping database 140 to see if system 100 has already received the data that the source storage system 180 has named Foo1. If the mapping database 140 includes an entry corresponding to Foo1 that shows that the data is stored at a local location (e.g., named Location5) of system 100, system 100 does not need to receive the corresponding data from the source storage system 180. The database check 115 can transmit, for example, a status message 116 to the source storage system 180 that the corresponding data is not needed because system 100 already has it.

On the other hand, if the mapping database 140 indicates that system 100 has not received the data that the source storage system 180 has named Foo1 (e.g., the mapping database 140 does not include an entry for Foo1), the replication manage 110 can ask the source storage system 180 to send the data (e.g., via the status message 116). The replicate component 125 of the replication manage 110 can receive the data 195, select a local storage location in the data store 170 of system 100, and write the data 195 to the local storage location. The database update 130 of the replication manage 110 can use the replication information 128 (such as the source-side data name and the local storage location) to update the mapping database 140 accordingly, so that any future references to the data named Foo1 can be made to the local storage location.

As discussed, in some situations, the mapping database 140 can be unavailable or inaccurate when an operation takes place on either the source storage system 180 or system 100 that alters the mapping of the data between the storage systems. Referring to the example, discussed, the database check 115 can receives the replication message 181 (e.g., "File X, which starts at offset Y and has length Z, uses data named Foo1 that has a fingerprint ABCD"), query the mapping database 140, and determine that that the mapping database 140 is unavailable or inaccurate. In such case, the database check 115 can transmit a fail message 114 to the fingerprint check 120 of the replication manage 110. The fail message 114 can indicate that the mapping database 140 cannot be used or is unable to resolve the source-side name Foo1 and cause the replication manage 110 to access or consult another destination-side indexing data structure, such as a fingerprint database 150.

A fingerprint database 150 can store a plurality of entries of fingerprints, where each entry corresponds to data previously received and stored in system 100. Each entry can include a respective fingerprint for the data, the identity of the file that uses the data, and respective information about where that file is stored in the source storage system 180. According to some examples, a fingerprint can correspond to a checksum value or hash sum value of the data. Typically, different data can result in a different checksum value. If a first checksum or fingerprint matches a second checksum or fingerprint, there is a high probability that the data that resulted in the first checksum is the same as the data that resulted in the second checksum. In some examples, the fingerprint database 150 can include duplicate fingerprints.

In response to receiving the fail message 114 (indicating that the mapping database 140 is unavailable or inaccurate), the fingerprint check 120 can use the fingerprint 189 of the first data received from the source storage system 180 (e.g., fingerprint ABCD) and access the fingerprint database 150 to determine whether the fingerprint 189 matches a fingerprint in the fingerprint database 150. Depending on implementation, the fingerprint check 120 can receive the fingerprint 189 of the first data when the replication message 181 is received by the replication manage 110 or receive the fingerprint 189 of the first data with the fail message 114 from the database check 115. The fingerprint 189 of the first data can be a checksum value that has been generated by the source storage system 180 using a checksum function or a checksum algorithm.

The fingerprint check 120 can perform a lookup in the fingerprint database 140 by comparing the fingerprint 189 with the fingerprint entries stored in the fingerprint database 140. If the fingerprint check 120 does not find a matching fingerprint in the fingerprint database 140, the replication manage 110 determines that the corresponding first data has not been received by system 100. The fingerprint check 120 can transmit a status message 122 to the source storage system 180 that the corresponding first data has not been received by system 100. Referring to the example discussed, the replication message 181 that was transmitted as part of a replication process specified that "File X, which starts at offset Y and has length Z, uses data named Foo1 that has a fingerprint ABCD." Because a matching fingerprint was not found in the fingerprint database 140, the fingerprint check 120 can request the source storage system 180 to transfer File X and data named Foo1 to system 100.

The replicate component 125 can receive the data 195 (e.g., File X and Foo1), select a local storage location in the data store 170 of system 100, and write the data 195 to the local storage location. The database update 130 of the replication manage 110 can use the replication information 128 (such as the source-side data name and the local storage location) to update the mapping database 140 and to also update the fingerprint database 150. The database update 130 can add an entry in the fingerprint database 150 that corresponds to the fingerprint 189 ("ABCD"), the file name 183 ("File X"), and the file information 185 ("offset Y, length Z").

On the other hand, if the fingerprint check 120 finds a fingerprint that matches the fingerprint 189 of the first data, the replication manage 110 determines that other data (e.g., second data) stored at system 100 has been found that is similar to the first data. For example, the request message 124 can specify that while the source storage system 180 asked system 100 to use data block named Foo1 for File X, which starts at offset Y and has length Z, similar data block (having the same fingerprint ABCD) is stored at system 100 that is used by a second file, File O, that is stored in the source storage system 180. The fingerprint check 120 can transmit a request message 124 to the source storage system 180 that asks the source storage system 180 to verify that the second data stored at system 100 is identical to the first data.

In one example, the request message 124 can include (i) the identity of a second file that uses the second data, and (ii) respective information about where the second file is stored in the source storage system 180. For example, the request message 124 can include an identity of a second file (e.g., "File O") that was previously received from the source storage system 180, with a particular offset P, length Q, and also having the fingerprint ABCD. In this manner, a request message 124 can be used to verify whether or not the first data and the second data are identical without having system 100 transmit the second data itself to the source storage system 180.

The source storage system 180 can receive the request message 124 and investigate its own version of File O, at offset P, length Q to determine what its local source-side VVBN or extent is being used to store the data used by File O. If the source storage system 180 determines that File O is using data with the source-side name Foo1, the source storage system 180 can provide a response message 190 to the replication manage 110 that it is sharing data between File X, at offset Y, length Z, and File O, at offset P, length Q. For example, File X and File O can each be a document file that uses an image that is stored at source-side location Foo1. The response message 190 can instruct system 100 to establish an association with File O, at offset P, length Q, with the data named Foo1, and to also establish an association with File X, at offset Y, length Z, with the data named Foo1.

The replication manage 110 can receive the request message 124 indicating that the first data is identical to the second data that is stored at system 100. Because the second data already stored at system 100 is identical to the first data, system 100 does not need to receive another copy of the first data named Foo1. The database update 130 can generate or update the mapping database 140 to include an entry that associates (i) the name of the first data stored at a first location of the source storage system (e.g., "Foo1"), and (ii) the local location where the second data is stored in the destination storage system (e.g., "Location5"). In this manner, the mapping database 140 can be generated and/or updated with accurate and up-to-date information for use with future replication processes.

The database update 130 can also update the fingerprint database 150 to include an entry corresponding to the replication message 181. The updated entry can include the fingerprint of the first data ("ABCD"), the identity of the first file that uses the data ("File X"), and the information about where the first file is stored in the source storage system 180 ("offset Y, length Z"). As an addition or an alternative, system 100 can determine if File X is needed, and if File X is not yet stored in the data store 170 of system 100, the replication manage 110 can request the source storage system 180 for File X. The replicate component 125 can receive and store the file, and subsequently, the database update 130 can update the mapping database 140 and the fingerprint database 150 with the association information between the source storage system 180 and system 100.

Referring back to the example, the source storage system 180 can receive the request message 124 and investigate its own version of File O, at offset P, length Q to determine what its local source-side VVBN or extent is being used to store the data used by File O. If, however, the source storage system 180 determines that the first data named Foo1 is not the data being used by File O (e.g., File O uses a source-side data name different than Foo1), the source storage system 180 can provide a response message 190 to the replication manage 110 that the first data is not identical to the second data. Depending on implementation, the source storage system 180 can transfer, concurrently with the response message 190 or separately, the first file ("File X") and the first data being used by the first file ("Foo1"). The replicate component 125 can receive and store the first file and the first data, and the database update 130 can update the mapping database 140 and the fingerprint database 150 with the association information between the source storage system 180 and system 100.

Methodology

Figure 2:
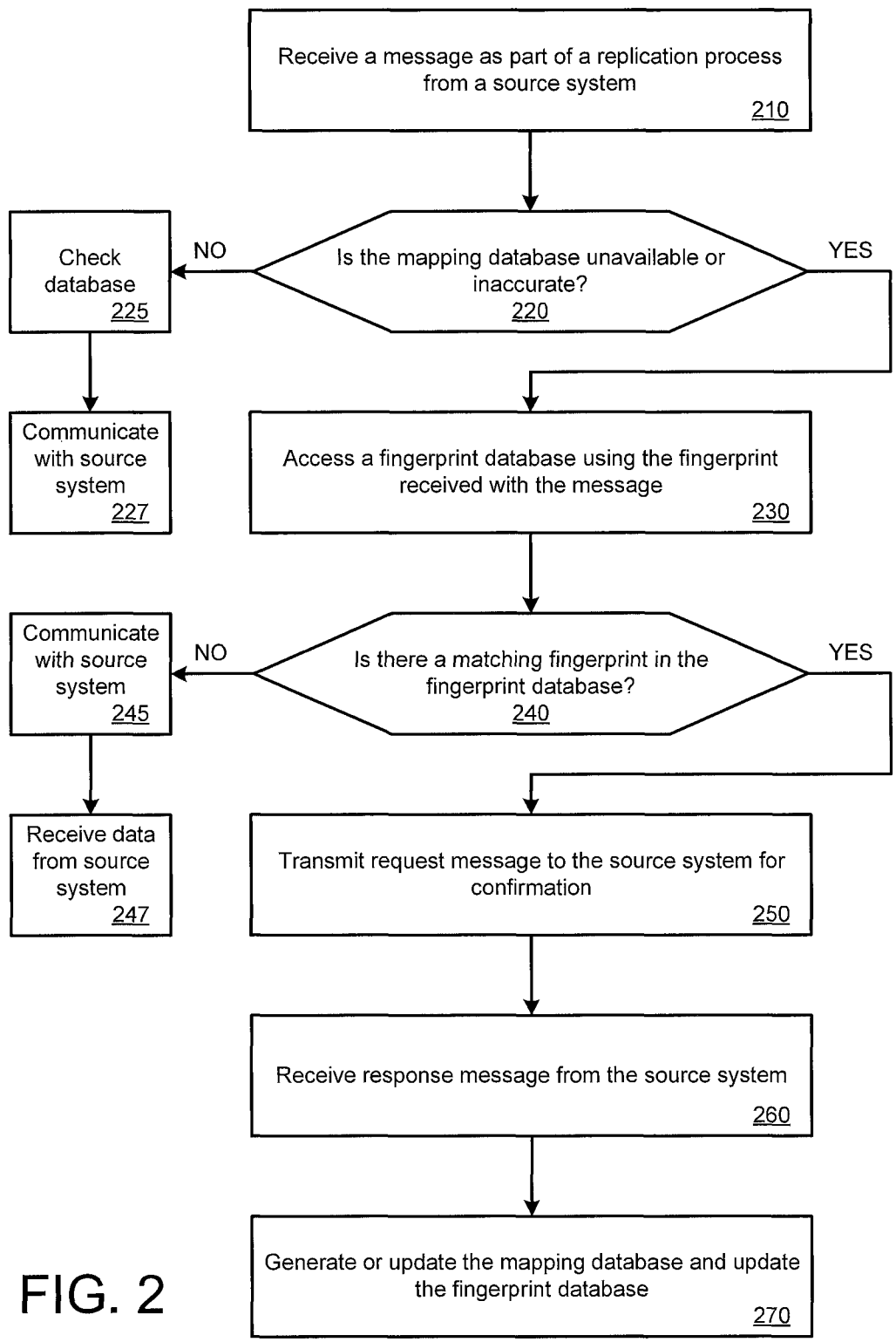
FIG. 2 illustrates an example method for performing data replication using data fingerprints.
Figure 3A:
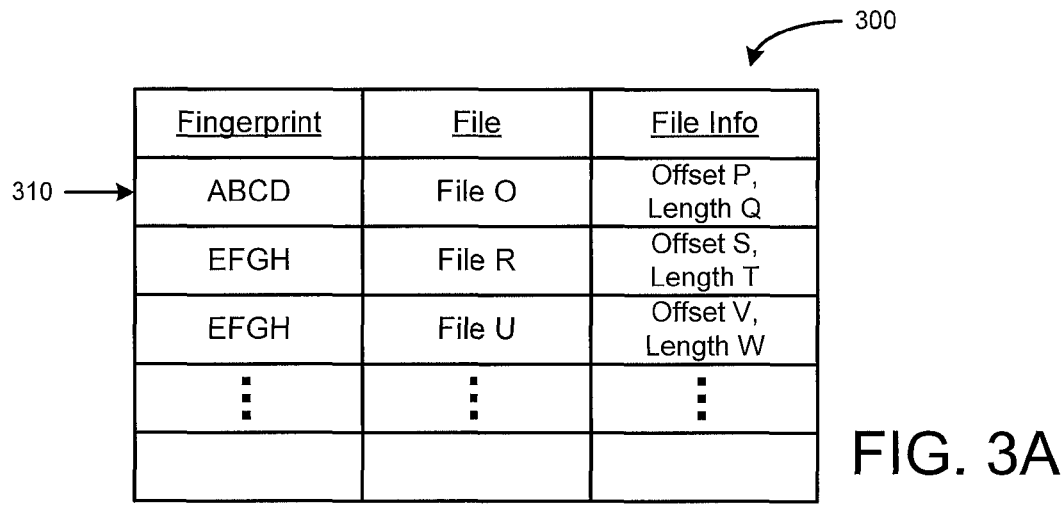
FIGS. 3A through 3C illustrate example databases used by a destination storage system.
Figure 3B:
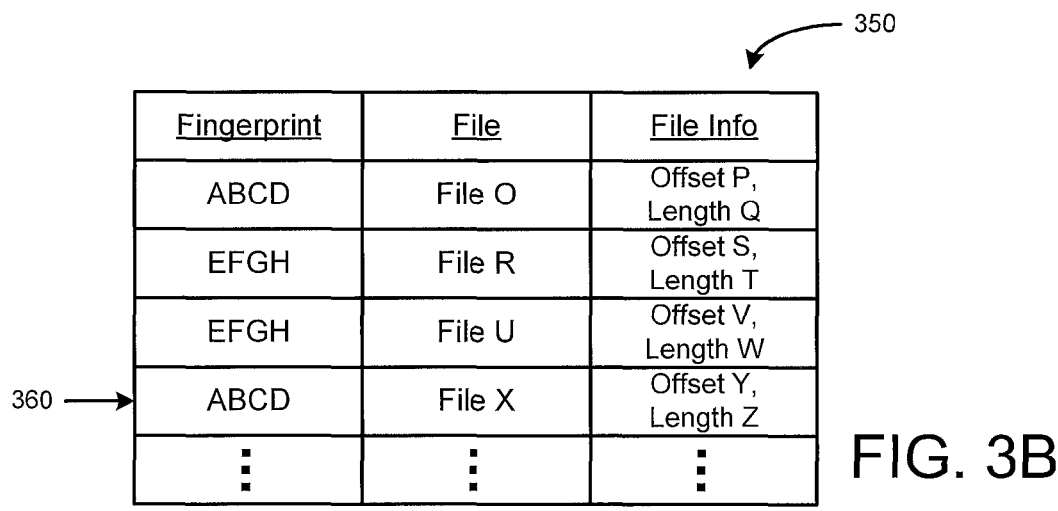

FIG. 2 illustrates an example method for performing data replication using data fingerprints. A method such as described by an example of FIG. 2 can be implemented using, for example, components described with an example of FIG. 1. Accordingly, references made to elements of FIG. 1 are for purposes of illustrating a suitable element or component for performing a step or sub-step being described. In addition, FIGS. 3A and 3B illustrate example databases used by a destination storage system. The databases, such as described by FIGS. 3A and 3B, can be used by, for example, components described with an example of FIG. 1. References to FIGS. 3A and 3B are made with respect to the example method of FIG. 2.

As an example, a source storage system ("source") can communicate with a destination storage system ("destination") for purposes of backing up or replicating data. For purposes of describing the method of FIG. 2, it is assumed that an initial or previous replication process has occurred that involved transferring data references for three different files from the source to the destination. The source may have sent three replication messages for the three files, as well as the files and data that the files used to the destination. For example, a first replication message can indicate to the destination that for File O, which starts at offset P and has length Q, the source is using data named Foo1 that has a fingerprint ABCD. A second replication message can indicate to the destination that for File R, which starts at offset S and has length T, the source is using data named Bar1 that has a fingerprint EFGH. A third replication message can indicate to the destination that for File U, which starts at offset V and has length W, the source is using data named Bar1 that has a fingerprint ABCD. In this example, two files, File R and File U are sharing the same region or location of data at the source.

Having received these replication messages, the destination would have generated and/or updated the mapping database with entries that map the source-side data name with the destination-side local location. The destination would have also updated the fingerprint database with three entries. FIG. 3A illustrates an example fingerprint database 300 with three entries 310 corresponding to the three replication messages received by the destination. Each entry can include (i) a fingerprint, (ii) the identity of a file that uses the data with that fingerprint, and (iii) information about the file, such as the offset and length.

Referring to FIG. 2, the destination can receive another message as part of a replication process from the source (210). The message can be a replication message 181 as part of a subsequent replication process between the source and the destination. The replication message 181 can include (i) an identity of a first file, (ii) information about where the first file is stored at the source, (iii) a name of a first data being used by the first file and stored at a first location of the source, and (iv) a fingerprint of the first data. For example, the replication message 181 can indicate to the destination that for File X, which starts at offset Y and has length Z, the source is using data named Foo1 that has a fingerprint ABCD. In response to receiving the replication message 181, the destination can determine whether its mapping database 140 is unavailable or inaccurate (220).

The mapping database 140 maps the source-side name to the destination-side name. If the mapping database 140 is available and accurate, the database check 115 accesses the mapping database 140 to determine whether the destination has already received the data that the source named Foo1 (225). Depending on whether or not an entry exists in the mapping database 140 for Foo1, the destination can communicate with the source to either (i) notify the source that the data the source named Foo1 has already been received, or (ii) request the source to send the data because the data has not been received yet by the destination (227). If the destination does not have the data, the replication manage 110, for example, can request the source to send the data, receive the data from the source, select a destination location to store the data, and update the mapping database 140 and a fingerprint database 150 with up-to-date mapping information and up-to-date fingerprint information, respectively.

Referring back to 220, if, on the other hand, the mapping database 140 is unavailable or inaccurate, the destination can access the fingerprint database 150 to determine whether data stored in the destination has a fingerprint identical to the fingerprint of the first data (e.g., "ABCD") (230). For example, the database check 115 can transmit a fail notification 114 to the fingerprint check 120, which then uses the fingerprint of the first data to search the fingerprint entries in the fingerprint database 150. A fingerprint can correspond to a checksum value or hash sum value of the data. Because different data typically results in different checksum values, if a first checksum or fingerprint matches a second checksum or fingerprint, there is a high probability that the data that resulted in the first checksum is the same as the data that resulted in the second checksum. In this manner, the destination can determine or identify whether any existing data similar to the first data is stored at the destination.

The fingerprint check 120 can determine whether there is a matching fingerprint to the fingerprint of the first data in the fingerprint database 150 (240). If no match is found, the destination can communicate with the source to notify the source that the data has not been received yet by the destination (245). The replication manage 110 can request the source to send the data, receive the data from the source, select a destination location to store the data, and update the mapping database 140 and a fingerprint database 150 with up-to-date mapping information and up-to-date fingerprint information, respectively (247).

However, if a match is found, the fingerprint check 120 can transmit a request message to the source for confirmation (250). For example, referring again to FIG. 3A, which illustrates the fingerprint database 150 of the destination after previous replication process(es), the fingerprint check 120 may perform a lookup of the fingerprint of the first data (e.g., "ABCD") in the fingerprint database 150 by comparing the fingerprint with the fingerprint entries stored in the fingerprint database 150. The fingerprint check 120 can determine that a previously received File O, which has offset P, length Q, uses data (e.g., second data) similar to the first data because that data also has fingerprint ABCD. Because fingerprints of data are not guaranteed to be perfectly unique (e.g., it is possible for two dissimilar sets of data to generate identical checksum values), the fingerprint check 120 can transmit a request message to the source asking the source to confirm that the data stored at the destination is identical to the first data. The request message can specify that the source instructed the destination to use data named Foo1 for File X, offset Y, length Z, but that similar data (e.g., second data) has been found at the destination used by File O, offset P, length Q. The request message can ask the source to confirm whether the first data and the second data are identical.

As an addition or an alternative, the fingerprint database 150 can also include, for each fingerprint entry, the source's snapshot identifier for each file as it is being transferred. This snapshot identifier can be passed back or transmitted from the destination to the source when requesting the source to verify that the second data is identical to the first data. The snapshot identifier provides the source with another checking mechanism for verifying data in order to find the original reference (e.g., File O) at the source. For example, although not shown in FIG. 3A, each entry of the fingerprint database 300 can include (i) a fingerprint, (ii) the identity of a file that uses the data with that fingerprint, (iii) information about the file, such as the offset and length, and (iv) a snapshot identifier for the file.

Referring back to FIG. 2, after the destination sends the request message for confirmation, the source can investigate its file system and provide a response message to the destination indicating whether the first data and the second data are identical or not (260). If the source determines that File O uses a different source-side name than Foo1, then the source has successfully avoided being fooled by a hash collision. In some examples, the source can investigate other possible matches that the destination advises it. The source can provide a response message to the destination that the first data is not identical to the second data. The destination can receive and store the first file and the first data, and update the mapping database 140 and the fingerprint database 150 with the association information between the source and the destination (270).

However, if the source determines that File O is in fact using data with the source-side name Foo1, the source can provide a response message to the destination that it is sharing data between File X, at offset Y, length Z, and File O, at offset P, length Q. The response message can instruct the destination to establish an association with File O, at offset P, length Q, with the data named Foo1, and to also establish an association with File X, at offset Y, length Z, with the data named Foo1. The destination can then generate or update the mapping database as well as the fingerprint database accordingly (270).

Figure 3C:
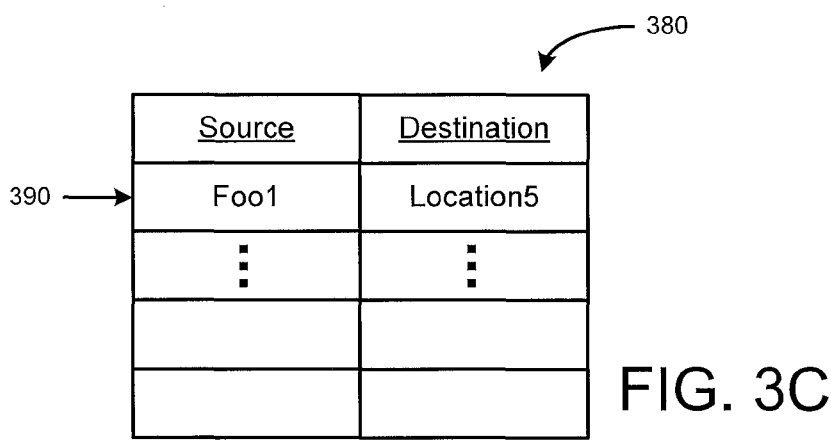

For example, the destination can update the fingerprint database to include entry 360, such as shown in the fingerprint database 350 of FIG. 3B. The entry 360 can correspond to the response message from the source instructing the destination to establish an association with File X, at offset Y, length Z, with the data named Foo1. In addition, the destination can generate or update its mapping database, such as the mapping database 380 as illustrated in FIG. 3C. The mapping database 380 can include an entry 390 that corresponds to the source-side name Foo1 and the destination-side location Location5 (where the corresponding data is stored at the destination). In this manner, the destination can generate or update the mapping database to include up-to-date information so that future subsequent replication processes between the source and destination can first use the mapping database for to achieve storage efficiency (e.g., by finding data already received and not having to perform unnecessary data transfers).

Hardware Diagram

Figure 4:
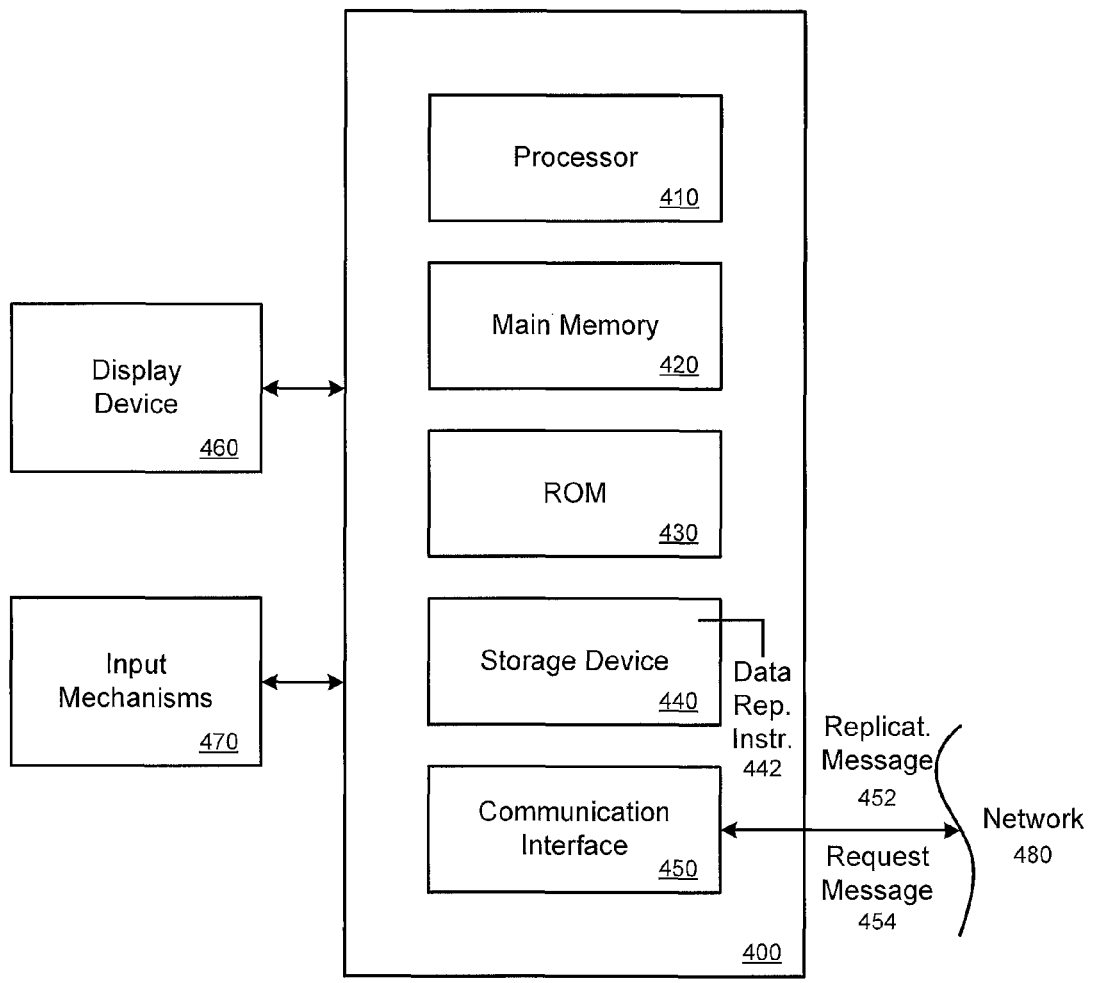
FIG. 4 is a block diagram that illustrates a computer system upon which examples described herein may be implemented.

FIG. 4 is a block diagram that illustrates a computer system upon which examples described herein may be implemented. For example, in the context of FIG. 1, system 100 may be implemented using a computer system such as described by FIG. 4. System 100 may also be implemented using a combination of multiple computer systems as described by FIG. 4.

In one implementation, computer system 400 includes processing resources 410, main memory 420, ROM 430, storage device 440, and communication interface 450. Computer system 400 includes at least one processor 410 for processing information and a main memory 420, such as a random access memory (RAM) or other dynamic storage device, for storing information and instructions to be executed by the processor 410. Main memory 420 also may be used for storing temporary variables or other intermediate information during execution of instructions to be executed by processor 410. Computer system 400 may also include a read only memory (ROM) 430 or other static storage device for storing static information and instructions for processor 410. A storage device 440, such as a magnetic disk or optical disk, is provided for storing information and instructions. For example, the storage device 440 can correspond to a computer-readable medium that stores data replication instructions 442 that, when executed by processor 410, may cause system 400 to perform operations described below and/or described above with respect to FIGS. 1 and 2 (e.g., operations of system 100 described above).

The communication interface 450 can enable computer system 400 to communicate with one or more networks 480 (e.g., computer network, cellular network, etc.) through use of the network link (wireless or wireline). Using the network link, computer system 400 can communicate with a plurality of systems, such as other data storage systems. In one example, computer system 400 can receive a replication message 452 from a source storage system (not shown) via the network link. When the processor 410 determines that a mapping database of the computer system 400 is unavailable or inaccurate, the processor 410 can access a fingerprint database using a fingerprint of first data received with the replication message 452. The processor 410 can determine whether data stored in the computer system 400 has a fingerprint that is identical to the received fingerprint. If the processor 410 determines that second data stored in the computer system 400 has an identical fingerprint, the processor 410 can transmit to the source storage system, over the network 480, a request message 454 to confirm whether the first data is identical to the second data stored in the computer system 400.

Computer system 400 can also include a display device 460, such as a cathode ray tube (CRT), an LCD monitor, or a television set, for example, for displaying graphics and information to a user. An input mechanism 470, such as a keyboard that includes alphanumeric keys and other keys, can be coupled to computer system 400 for communicating information and command selections to processor 410. Other non-limiting, illustrative examples of input mechanisms 470 include a mouse, a trackball, touch-sensitive screen, or cursor direction keys for communicating direction information and command selections to processor 410 and for controlling cursor movement on display 460.

Examples described herein are related to the use of computer system 400 for implementing the techniques described herein. According to one example, those techniques are performed by computer system 400 in response to processor 410 executing one or more sequences of one or more instructions contained in main memory 420. Such instructions may be read into main memory 420 from another machine-readable medium, such as storage device 440. Execution of the sequences of instructions contained in main memory 420 causes processor 410 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method implemented by a computing system that includes a memory and a processor, the method comprising:
   receiving, by the processor, a message comprising an identity of a first file, information about where the first file is stored in a first storage system, a name of a first data being used by the first file and stored at a first location of the first storage system, and a fingerprint of the first data;
   determining that a mapping database of a second storage system, which maps storage locations of data in the first storage system to storage locations of replicated data in the second storage system, is unavailable; and
   accessing a fingerprint database of the second storage system using the fingerprint to determine whether replicated data stored in the second storage system has a second fingerprint identical to the fingerprint of the first data, wherein the fingerprint database stores entries of fingerprints of replicated data stored by the second storage system, an entry corresponding to first replicated data stored in the second storage system and comprising a corresponding fingerprint for the first replicated data, a corresponding identity of a file that uses the first replicated data, and corresponding information about where the file is stored;
   transmitting, to the first storage system, a request message to confirm whether the first data is identical to the replicated data having the second fingerprint;
   receiving a response message indicating that the first data is identical to the replicated data;
   updating the mapping database by associating the name of the first data stored at the first location with a location of the replicated data stored by the second storage system; and
   updating the fingerprint database to include a new entry for the first file, the new entry including the fingerprint of the first data, the identity of the first file, and information about where the first file is stored.

2. The method of claim 1, wherein the corresponding information, within the entry of the fingerprint database, about where the file is stored in the first storage system corresponds to an offset value and a length value.

3. The method of claim 1, wherein the fingerprint of the first data corresponds to a checksum value generated by the first storage system using a checksum function.

4. The method of claim 1, wherein the request message includes respective information about where a second file that uses the replicated data is stored.

5. The method of claim 1, wherein accessing the fingerprint database includes performing a lookup in the fingerprint database by comparing the fingerprint of the first data with the entries of fingerprints stored in the fingerprint database.

6. The method of claim 1,
   wherein the request message includes an identity of a second file that uses the replicated data.

7. The method of claim 1, wherein the request message causes the first storage system to determine whether the first data, being used by the first file, is identical to the replicated data stored in the second storage system.

8. The method of claim 1, wherein the response message indicates that the first data is not identical to the replicated data, and the method further comprising:
receiving the first file and the first data;
storing the first data within a local location in the second storage system;
updating the mapping database by associating the name of the first data stored at the first location of the first storage system with the local location where the first data is stored in the second storage system; and
updating the fingerprint database to include the new entry for the first file, the new entry including the fingerprint of the first data, the identity of the first file, and information about where the first file is stored in the first storage system.

9. A non-transitory computer-readable medium comprising instructions that, when executed by a processor, cause the processor to perform operations comprising:
receiving a message comprising an identity of a first file, information about where the first file is stored in a first storage system, a name of a first data being used by the first file and stored at a first location of the first storage system, and a fingerprint of the first data;
determining that a mapping database of a second storage system, which maps storage locations of data in the first storage system to storage locations of replicated data in a second storage system, is unavailable;
accessing a fingerprint database of the second storage system using the fingerprint to determine whether data stored in the second storage system has a second fingerprint identical to the fingerprint of the first data, wherein the fingerprint database stores entries of fingerprints, an entry corresponding to data stored in the second storage system and comprising a corresponding fingerprint for the data, an identity of a file that uses the data, and corresponding information about where the file is stored in the first storage system;
determining that a second data stored in the second storage system has the second fingerprint that is identical to the fingerprint of the first data;
transmitting, to the first storage system, a request message to confirm whether the first data is identical to the second data;
receiving a response message indicating that the first data is identical to the second data;
updating the mapping database by associating the name of the first data stored at the first location with a local location where the second data is stored by the second storage system; and
updating the fingerprint database to include an entry for the first file, the entry including the fingerprint of the first data, the identity of the first file, and information about where the first file is stored.

10. The non-transitory computer-readable medium of claim 9, wherein the information about where the first file is stored corresponds to an offset value and a length value associated with the first storage system.

11. The non-transitory computer-readable medium of claim 9, wherein the fingerprint of the first data corresponds to a checksum value generated by the first storage system using a checksum function.

12. The non-transitory computer-readable medium of claim 9, wherein the corresponding information, within the entry of the fingerprint database, comprises an offset value and a length value associated with the first storage system.

13. The non-transitory computer-readable medium of claim 9, wherein the operations comprise
accessing the fingerprint database by performing a lookup in the fingerprint database by comparing the fingerprint of the first data with the entries of fingerprints stored in the fingerprint database.

14. The non-transitory computer-readable medium of claim 13, wherein the request message includes an identity of a second file that uses the second data and respective information about where the second file is stored in the first storage system, the request message causing the first storage system to determine whether the first data being used by the first file is identical to the second data stored in the second storage system.

15. The non-transitory computer-readable medium of claim 14, wherein the mapping database comprises a mapping entry mapping a source-side name, used by the first storage system to refer to the first file, to a location of where data, of the first file, is stored by the second storage system.

16. The non-transitory computer-readable medium of claim 9, wherein the response message indicates that he first data is not identical to the second data.

17. The non-transitory computer-readable medium of claim 16, wherein the operations comprise:
receiving the first file and the first data based upon the response message indicating that the first data is not identical to the second data;
storing the first data within a local location in the second storage system; updating the mapping database by associating the name of the first data stored at the first location of the first storage system with the local location where the first data is stored in the second storage system; and
updating the fingerprint database to include a new entry for the first file, the new entry including the fingerprint of the first data, the identity of the first file, and information about where the first file is stored in the first storage system.

18. A computing device comprising:
a memory resource storing instructions; and
at least one processor coupled to the memory resource, the at least one processor executing the instructions to perform operations comprising:
receiving a message comprising an identity of a first file, information about where the first file is stored in a first storage system, a name of a first data being used by the first file and stored at a first location of the first storage system, and a fingerprint of the first data;
determining that a mapping database of a second storage system, comprising entries mapping source-side names, used by the first storage system to refer to files, to locations of where data of the files is stored by the second storage system, is inaccurate;
accessing a fingerprint database of the second storage system using the fingerprint to determine whether data stored in the second storage system has a second fingerprint identical to the fingerprint of the first data, wherein the fingerprint database stores entries of fingerprints, an entry corresponding to data stored in the second storage system and comprising a corresponding fingerprint for the data, a corresponding identity of a file the uses that data, and corresponding information about where the file is stored in the first storage system;

transmitting, to the first storage system, a request message to confirm whether the first data is identical to the second data;

receiving a response message indicating that the first data is identical to the second data;

updating the mapping database by associating the name of the first data stored at the first location with a local location where the second data is stored by the second storage system; and updating the fingerprint database to include an entry for the first file, the entry including the fingerprint of the first data, the identity of the first file, and information about where the first file is stored.

19. The computing device of claim 18, wherein the information about where the first file is stored corresponds to an offset value and a length value, and wherein the fingerprint of the first data corresponds to a checksum value.

\* \* \* \* \*